United States Patent [19]
Lee

[11] Patent Number: 5,944,245
[45] Date of Patent: Aug. 31, 1999

[54] DEVICE FOR FUSING SHANK AND CUTTING EDGE OF BIT

[76] Inventor: Yi-Lung Lee, No. 386, Sec. 2, Kang Nan Road, Wu Chi Chen, Taichung Hsien, Taiwan

[21] Appl. No.: 08/927,675

[22] Filed: Sep. 10, 1997

[51] Int. Cl.[6] .................................................. B23K 13/01
[52] U.S. Cl. .............................. 228/6.1; 228/9; 228/49.1; 219/79; 219/617; 219/635
[58] Field of Search .............................. 228/6.1, 9, 49.1; 219/61.2, 79, 77, 603, 617, 635

[56] References Cited

U.S. PATENT DOCUMENTS

| | | | |
|---|---|---|---|
| 1,984,300 | 12/1934 | Cornell | 228/49.1 |
| 3,433,920 | 3/1969 | Hedquist | 219/79 |
| 3,972,099 | 8/1976 | Olsson et al. | 228/49.1 |

OTHER PUBLICATIONS

H. Bunte, "Brazing and Other Applications of High–Frequency Heating," *The Welding Journal,* (Jun. 1948) pp. 441–444.

*Primary Examiner*—Patrick Ryan
*Assistant Examiner*—Jeffrey T. Knapp
*Attorney, Agent, or Firm*—Browdy and Neimark

[57] ABSTRACT

A device for fusing a shank and a cutting edge to form a bit is composed of a bottom plate on which a shank locating apparatus, a heater, a cutting edge locating apparatus, a collection apparatus, and a pneumatic-electro control apparatus are mounted. The device can be manually or automatically operated through the pneumatic-electro control apparatus such that a plurality of shanks are arranged and located one after another at a first fusion position, and that a plurality of cutting edges are arranged and located one after another at a second fusion position. The shank located at the first fusion position is heated by the heater before the shank is fused with the cutting edge located at the second fusion position.

12 Claims, 4 Drawing Sheets

DEVICE FOR FUSING SHANK AND CUTTING EDGE OF BIT

FIELD OF THE INVENTION

The present invention relates generally to a device for making a bit, and more particularly to a device for fusing the shank and the cutting edge of the bit.

BACKGROUND OF THE INVENTION

The shank and the cutting edge of the conventional carbide steel bit for high-speed machining are generally fused by sintering. The sintering process is not cost-effective in view of the fact that the sintering process is applicable to the fusion of a shank and a cutting edge, which are made of the same material. For this reason, the welding process is now used to fuse a shank of a stainless steel with a cutting edge of a carbide steel. The welding process is relatively economical; nevertheless it undermines the concentricity of the shank and the cutting edge of a bit. Such bit can not be used for a high-speed precision machining.

SUMMARY OF THE INVENTION

It is therefore the primary objective of the present invention to provide a cost-effective device for fusing the shank and the cutting edge of a bit.

It is another objective of the present invention to provide an automated device for fusing the shank and the cutting edge of a bit. The shank and the cutting edge of the bit are made of different materials.

It is still another objective of the present invention to provide a device capable of a concentric fusion of the shank and the cutting edge of a bit.

In keeping with the principle of the present invention, the foregoing objectives of the present invention are attained by a device consisting of a bottom plate, a shank locating apparatus, a cutting edge locating apparatus, a heater, a collection apparatus, and a pneumatic-electro control apparatus. The shank locating apparatus is disposed on the bottom plate for arranging orderly the shanks to be treated by the heater. The cutting edge locating apparatus is disposed on the bottom plate for arranging orderly the cutting edges such that the cutting edges and the shanks are coaxially located. Upon completion of the process of fusing the shanks with the cutting edges, the bits are collected by the collection apparatus. The device is automatically operated and controlled by the pneumatic-electro control apparatus.

The foregoing objectives, features and functions of the present invention will be more readily understood upon a thoughtful deliberation of the following detailed description of an embodiment of the present invention with reference to the accompanying drawings.

DETAILED DESCRIPTION OF THE INVENTION

Figure 1:
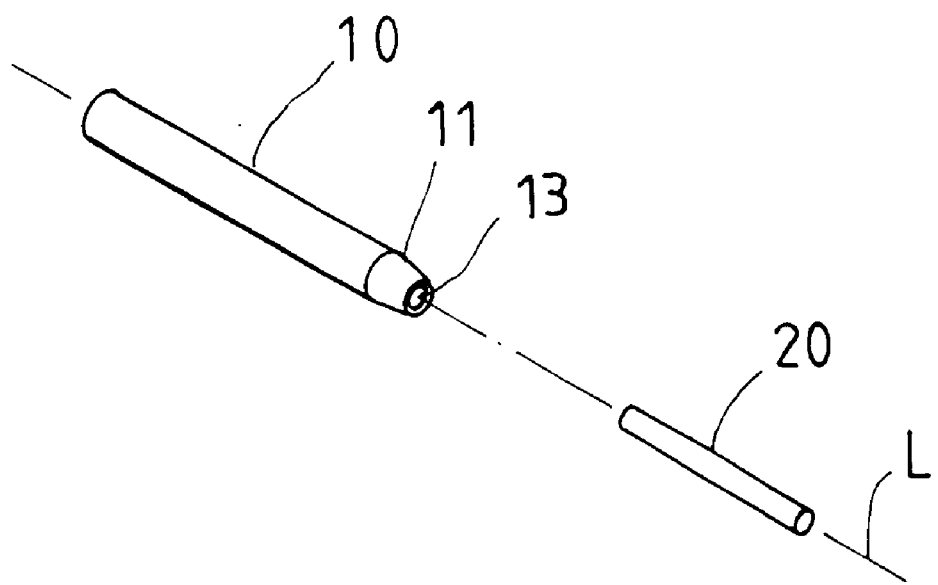
FIG. 1 shows a schematic view of a shank and a cutting edge of the embodiment of the present invention.

As shown in FIG. 1, the device of the present invention is intended for use in fusing a shank 10 and a cutting edge 20, so as to form a bit. The shank 10 is made of stainless steel and provided with a tapered end 11, which is in turn provided with a fusing hole 13. The cutting edge 20 is made of tungsten steel and has an outer diameter slightly greater than the inner diameter of the fusion hole 13. In the fusion process, the cutting edge 20 is located apart from the fusion hole 13 by a predetermined distance such that the cutting edge 20 and the shank 10 are located coaxially on a preparation line L indicated by a dotted line in FIG. 1. The tapered end 11 of the shank 10 is heated to cause the fusion hole 13 to expand to enable the cutting edge 20 to be forced into the fusion hole 13. Upon completion of a cooling process, a bit is formed.

Figure 2:
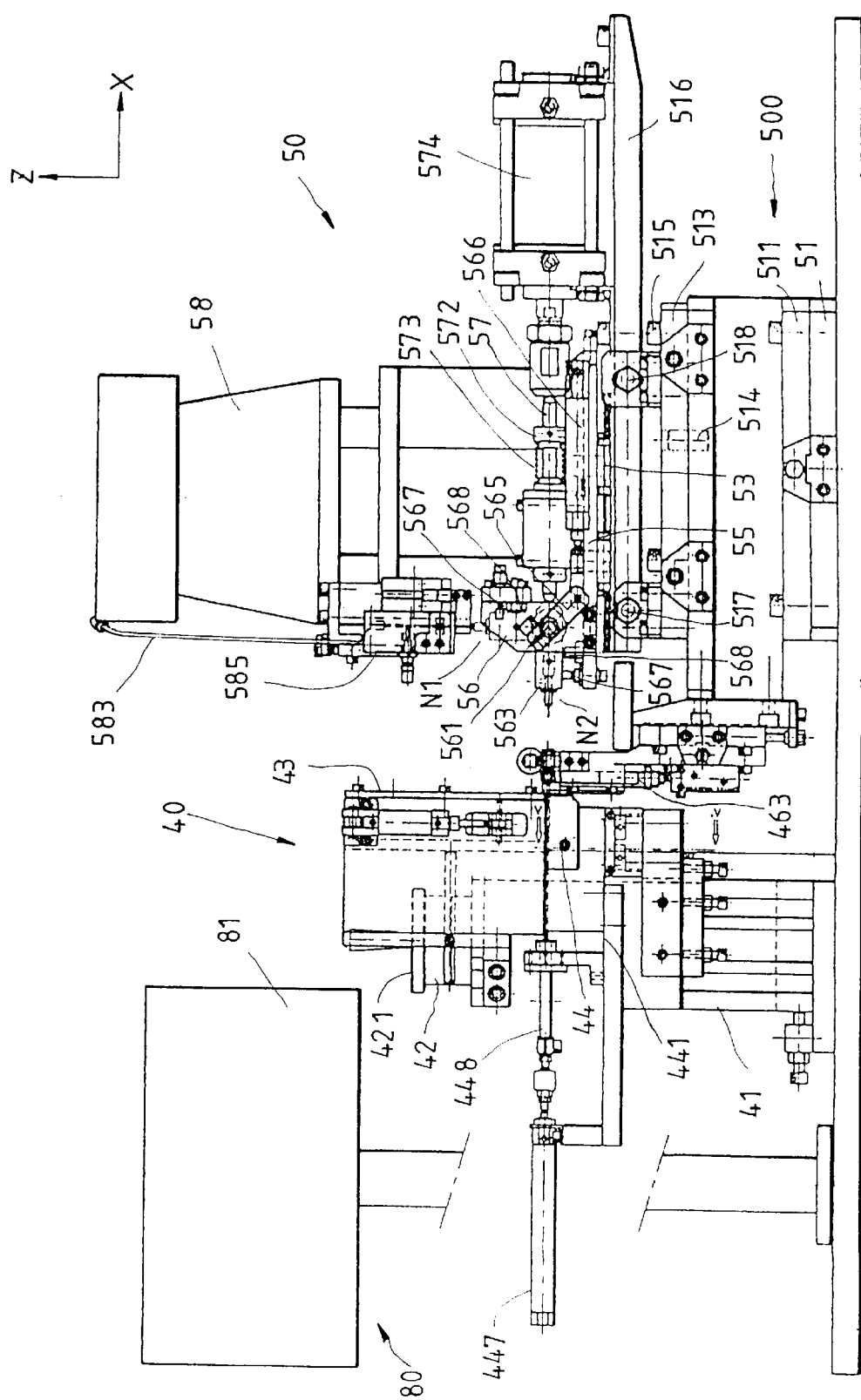
FIG. 2 shows a front view of the device embodied in the present invention.
Figure 3:
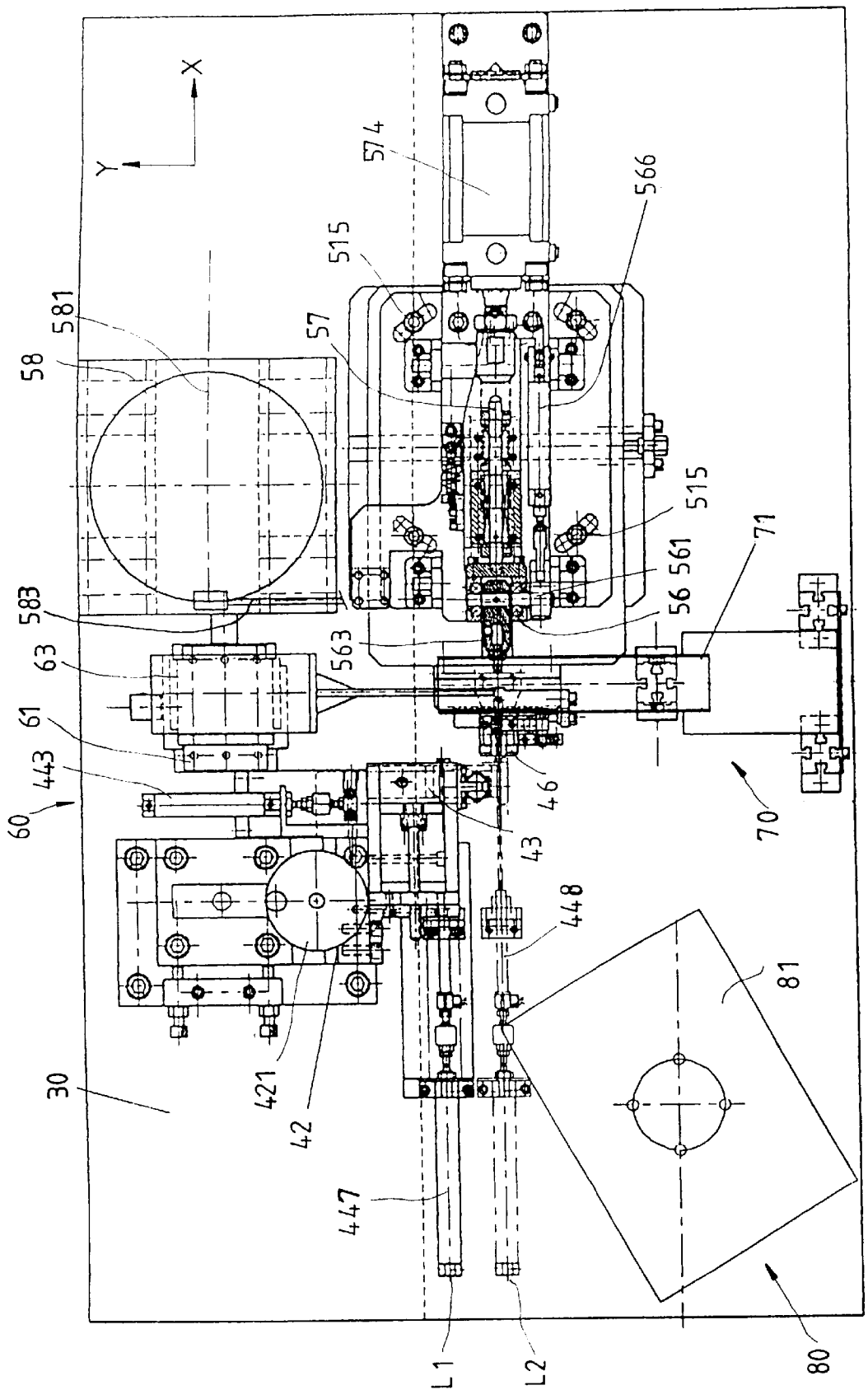
FIG. 3 shows a top plan view of the device embodied in the present invention.
Figure 4:
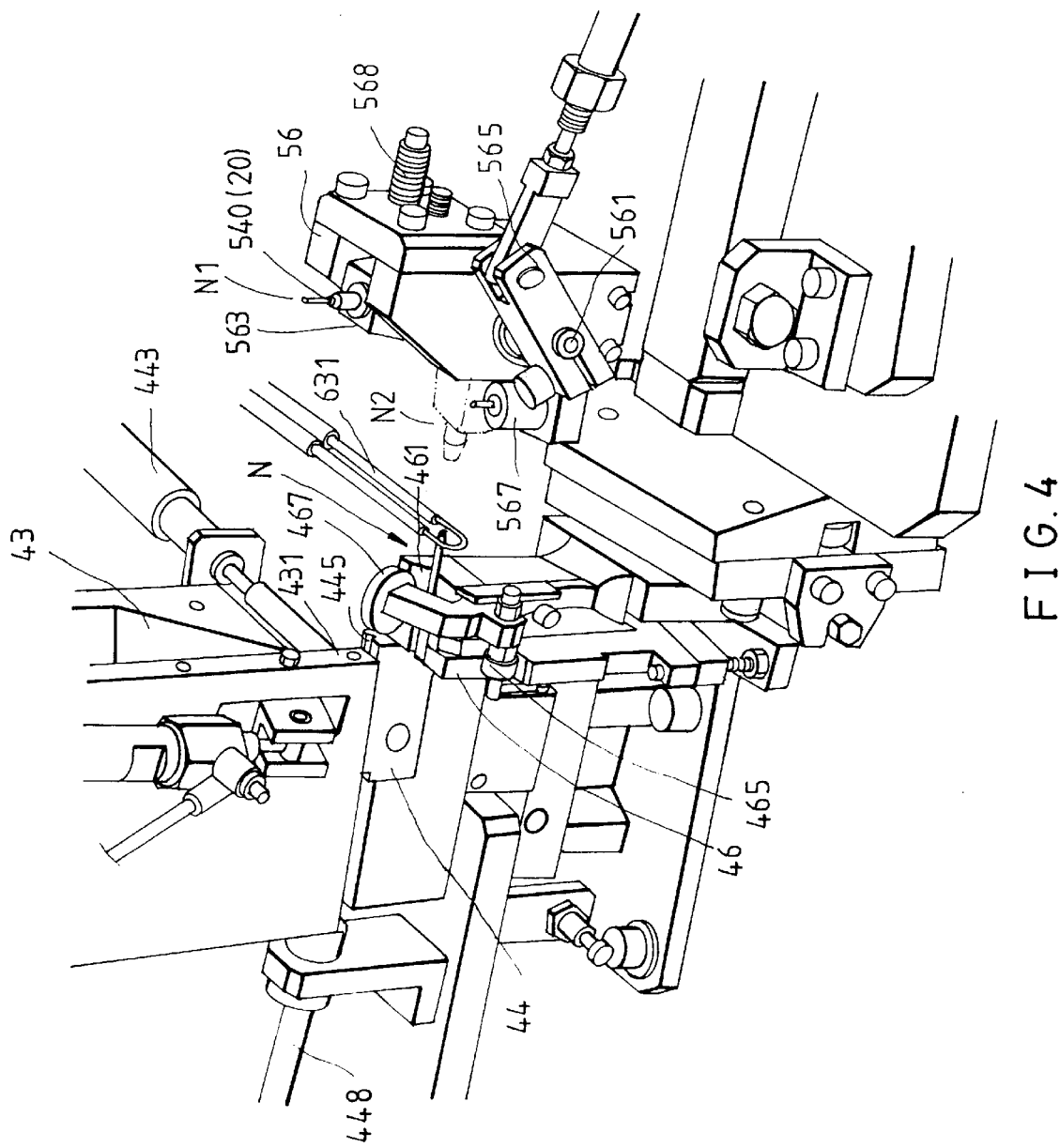
FIG. 4 shows a partial perspective view of the device of the present invention.

As illustrated in FIGS. 2–4, the device embodied in the present invention is composed of the component parts, which are described explicitly hereinafter.

A flat bottom plate 30 is made of stainless steel for mounting thereon other component parts of the device. The bottom plate 30 can be securely located on a machine platform or work table.

A shank locating apparatus 40 comprises a frame 41 mounted on the upper side of the bottom plate 30, a shank arranging mechanism 42 mounted on the frame 41 and provided with a receiving compartment 421 for holding shanks 10 in quantity and arranging shanks 10 in such a way that the tapered ends 11 of the shanks 10 face a specific direction before the shanks 10 are conveyed to a slot 43 which has an exit end 431 provided with a slide seat 44. The slide seat 44 is mounted on a movable platform 441 capable of being driven by a first cylinder 443 to slide along and Y axis between a first position $L_1$ and a second position $L_2$. The slide seat 44 is provided at the center thereof with a V-shaped trough 445 for keeping the shanks 10. A second cylinder 447 is mounted coaxially with the trough 445 and provided with an urging rod 448 capable of extending to push the shanks 10 along the direction of the X-axis of the trough 445. A locating seat 46 is mounted on the upper side of the bottom plate 30 and provided at the center thereof with a V-shaped trough 461 for keeping those shanks 10 which have been properly arranged. A third cylinder 463 has an output end connected with a connection rod set 465 which is provided at one end thereof with a pressing member 467 capable of being driven by the third cylinder 463 to press against the shanks 10 located in the trough 461. As a result, the shanks 10 are located at a first fusion position N.

A cutting edge locating apparatus 50 consists of a frame 500 which is composed of a base 51, a base-adjusting plate 511 capable of adjusting the position of the base 51 along the direction of Y-axis. The base-adjusting plate 511 is provided with an angle-adjusting plate 513 capable of rotating on a shaft 514. The angle-adjusting plate 513 is located by means of four bolts 515 and provided with a slide shaft fastening plate 516 capable of swinging on a shaft 517 in the direction of Z-axis. The slide shaft fastening plate 516 is located by means of a bolt 518 after the swing plate 516 has been swiveled for an angle. A slide rail 53 is mounted on the plate 516 and provided with a sliding platform 55. A swing arm fastening seat 56 is mounted in front of the sliding platform 55 and is fastened pivotally with a swing arm 563 in conjunction with a swing arm shaft 561. The swing arm 563 is provided at one end thereof with a receiving hole 564 for receiving the cutting edge 20. The swing arm shaft 561 is fastened with a fourth cylinder 566 by means of a connection rod 565 such that the swing arm 563 can be actuated by the fourth cylinder 566 to swing between a receiving position $N_1$ and a second fusion position $N_2$. The impulse of the swing arm 563 in motion is mitigated by a buffer 567 and a locating member 568. An urging rod 57 is disposed between a rod seat 571 and a spring seat 572. A compression spring 573 is disposed between the rod seat 571 and the spring seat 572. A fifth cylinder 574 is mounted on the slide shaft fastening plate 516. A vibration machine 58 is mounted on the bottom plate 30 and provided with a receiving compartment 581 for keeping the cutting edges 20 in quantity. The cutting edges 20 are arranged and conveyed via a conveying tube 583 to a separation mechanism 585 located over the swing arm 563 which is located at the receiving position $N_1$, thereby enabling the cutting edges 20 to be deposited sequentially into the receiving hole 564 of the swing arm 563.

A heater 60 is composed of a platform 61 capable of a triple motion. A high frequency heater 63 is mounted on the platform 61 such that the heating coil 631 of the high frequency heater 63 is located outside the locating seat 46.

A collection apparatus 70 consists of a collection tray 71 which is located under the heating coil 631 of the high frequency heater 63 for collecting the finished work pieces.

A pneumatic-electro control apparatus 80 is electrically connected with each of the main components described above for controlling the automated operation of the device of the present invention. The control apparatus 80 has a control box 81 which is mounted on the upper side of the bottom plate 30 and is provided with a control panel.

In operation, the shanks 10 are orderly arranged by the shank arranging mechanism 42 before they are located in the V-shaped through 445 of the slide seat 44 via the slot 43. The loaded slide seat 44 is then pushed from the first position $L_1$ to the second position $L_2$ by the first cylinder 443 in the direction of the negative Y axis, as shown in FIG. 3, such that the V-shaped trough 445 is connected coaxially with the V-shaped trough 461 of the locating seat 46. In the meantime, the urging rod 448 of the second cylinder 447 extends in the direction of the positive X axis to urge the shank 10 to slide into the V-shaped trough 461 of the locating seat 46 such that the tapered end 11 of the shank 10 is located outside the locating seat 46 and in the center of the heating coil 631 of the high frequency heater 63. Thereafter, the pressing member 467 is actuated by the third cylinder 463 to press firmly the shank 10 so as to locate the shank 10 securely at the first fusion position N. The urging rod 448 of the second cylinder 447 is retracted to its original position. The first cylinder 443 is also retracted to enable the slide seat 44 to move back to the first position $L_1$ from the second position $L_2$, so as to load another piece of shank 10 to be processed.

The cutting edges 20 are orderly arranged by the vibration machine 58 at the time when the arranging and the locating processes of the shanks 10 are under way. The cutting edges 20 are then conveyed to the separation mechanism 585 via the conveying tube 583. The cutting edges 20 are separated and deposited in the receiving hole 564 of the swing arm 563 which is located at the receiving position $N_1$. Thereafter, the connection rod 565 is driven by the fourth cylinder 566 to actuate the swing arm 563 to swivel for an angle of 90 degrees from the receiving position $N_1$ to the second fusion position $N_2$, thereby enabling the cutting edge 20 to be in alignment with the shank 10 which is located at the first fusion position N.

The shank 10 located at the first fusion position N is heated by the high frequency heater 63 to cause the fusion hole 13 to expand. In the meantime, the swing arm 563 is driven by the fifth cylinder 574 to displace from the second fusion position $N_2$ in the direction of the negative X axis, so as to enable the cutting edge 20 located in the receiving hole 564 of the swing arm 563 to be forced into the fusion hole 13 to form a bit consisting of the shank 10 and the cutting edge 20. The heating process is then automatically interrupted, whereas the shank 10 of the bit is released by the pressing member 467 to allow the shank 10 of the bit to be pushed away by a forthcoming shank 10 to be collected by the collection tray 71 of the collection apparatus 70. The swing arm 563 slides in the direction of the positive X axis to return to the second fusion position $N_2$ where the swing arm 563 is driven by the fourth cylinder 566 to swing back to the receiving position $V_1$ to be ready to pick up another shank 20 from the separation mechanism 585, so as to carry out the fusion process repeatedly.

The automated device of the present invention is capable of precision fusing of the shank 10 and the cutting edge 20, with the concentricity being in the range of $20^{-5}$–$40^{-5}$ meter. As a result, the bit formed by the device of the present invention can be directly treated with a precision polishing to be ready for testing. The pneumatic-electro control apparatus 80 of the device of the present invention can be operated manually or automatically.

What is claimed is:

1. A device for fusing a shank and a cutting edge of a bit, said device comprising a bottom plate on which a shank locating apparatus, a heater, a cutting edge locating apparatus, a collection apparatus and a pneumatic-electro control apparatus are mounted;

wherein said shank locating apparatus is provided with means for arranging a plurality of shanks in a specific order to locate the shanks one after another at a first fusion position;

wherein said heater is mounted on a platform to facilitate the heating of a fusion hole of the shank located at the first fusion position;

wherein said cutting edge locating apparatus is provided with means for arranging a plurality of cutting edges in a specific order to locate the cutting edges one after another at a second fusion position;

wherein said collection apparatus is provided with means for collecting the bit formed of the shank and the cutting edge; and wherein said pneumatic-electro control apparatus is electrically connected with said shank locating apparatus, said heater, said cutting edge locating apparatus, and said collection apparatus.

2. The device as defined in claim 1, wherein said heater is a high frequency heater.

3. The device as defined in claim 1, wherein said pneumatic-electro control apparatus is manually operated.

4. The device as defined in claim 1, wherein said pneumatic-electro control apparatus is automatically operated.

5. The device as defined in claim 1, wherein said cutting edge locating apparatus comprises:

a frame mounted on said bottom plate and provided with a movable platform having a swing arm fastened pivotally therewith such that said swing arm is capable of swiveling between a receiving position and said second fusion position, said swing arm provided with a receiving hole for receiving and holding a cutting edge;

a vibration machine for receiving and arranging a plurality of cutting edges in a specific order; and a separation mechanism connected with said vibration machine for depositing sequentially the cutting edges arranged by said vibration machine in said receiving hole of said swing arm located at said receiving position.

6. The device as defined in claim 5, wherein said movable platform is provided with a fourth cylinder fastened therewith for driving said swing arm to swivel between said receiving position and said second fusion position.

7. The device as defined in claim 5, wherein said frame is provided with a fifth cylinder mounted thereon for driving said movable platform to slide in a specific direction.

8. The device as defined in claim 1, wherein said shank locating apparatus comprises:

a shank arranging mechanism for receiving and arranging a plurality of shanks in a manner that fusion holes of all shanks face a specific direction;

a slot in communication with said shank arranging mechanism and having an exit end for discharging the shank;

a locating seat provided with a trough for receiving the shank, said locating seat further provided with a pressing member for holding firmly the shank located at said first fusion position; and a slide seat provided with a trough having an urging rod, said slide seat capable of moving between a first position and a second position, with said first position being located at said exit end of said slot, said trough of said slide seat being connected coaxially with said trough of said locating seat at such time when said slide seat is located at said second position, so as to enable the shank located in said trough of said slide seat to be urged by said urging rod to locate at said first fusion position in said trough of said locating seat.

9. The device as defined in claim 8, wherein said locating seat is provided with a third cylinder fastened therewith for driving said pressing member of said locating seat.

10. The device as defined in claim 8, wherein said shank locating apparatus is supported by a frame mounted on said bottom plate.

11. The device as defined in claim 10, wherein said frame is provided with a first cylinder mounted thereon for driving said slide seat to move between said first position and said second position.

12. The device as defined in claim 10, wherein said frame is provided with a second cylinder mounted thereon for driving said urging rod of said slide seat.

* * * * *